United States Patent
Miley

[11] 3,871,217
[45] Mar. 18, 1975

[54] CONTINUOUS CABLE TENSION MONITOR
[75] Inventor: David C. Miley, Los Altos, Calif.
[73] Assignee: The Rucker Company, Oakland, Calif.
[22] Filed: Apr. 25, 1973
[21] Appl. No.: 354,390

[52] U.S. Cl.................. 73/143, 73/67.2, 73/DIG. 1
[51] Int. Cl. .............................................. G01l 5/10
[58] Field of Search..... 73/143, 67.2, 67.4, 517 AV, 73/DIG. 1; 331/156

[56] References Cited
UNITED STATES PATENTS

| | | | |
|---|---|---|---|
| 2,675,698 | 4/1954 | Johnson | 73/67.2 |
| 3,391,560 | 7/1968 | Mathey | 73/67.2 |
| 3,394,587 | 7/1968 | Freeman | 73/143 |
| 3,540,271 | 11/1970 | Hoff | 73/143 |
| 3,706,026 | 12/1972 | Johnson, Jr. et al. | 73/67.2 X |

FOREIGN PATENTS OR APPLICATIONS

| | | | |
|---|---|---|---|
| 509,647 | 7/1939 | Great Britain | 73/DIG. 1 |

Primary Examiner—Charles A. Ruehl
Attorney, Agent, or Firm—Lothrop & West

[57] ABSTRACT

A cable tension monitor has an electromagnet having a C-shaped pole piece extending along a cable adjacent thereto with the poles in a plane parallel to the cable axis. A coil on the pole piece is energized substantially at the natural frequency of the cable when under tension. A pair of pick-up coils are connected oppositely in series and are disposed on either side of the electromagnet close to the cable. The pick-up coils furnish repeated signals in accordance with perturbations in the magnetic field set up by the electromagnet and induced by cable vibration. The signals are used to time the energization of the electromagnet and to operate an indicating device. Spurious signals are rejected and noise is conditioned to the natural frequency of the cable. The indication given takes into account the stiffness of the cable.

11 Claims, 8 Drawing Figures

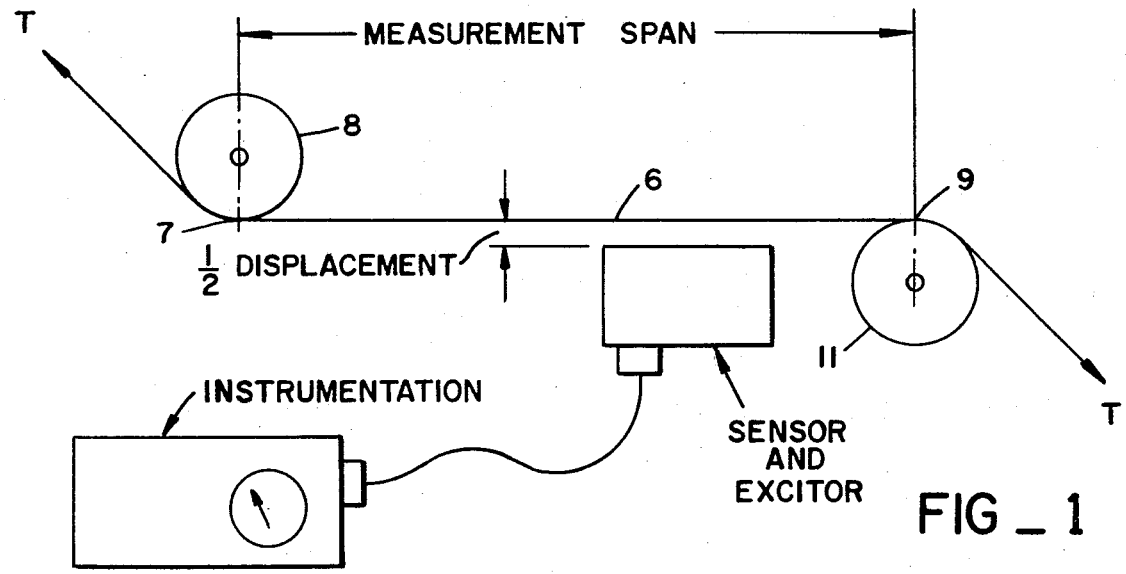
FIG_1
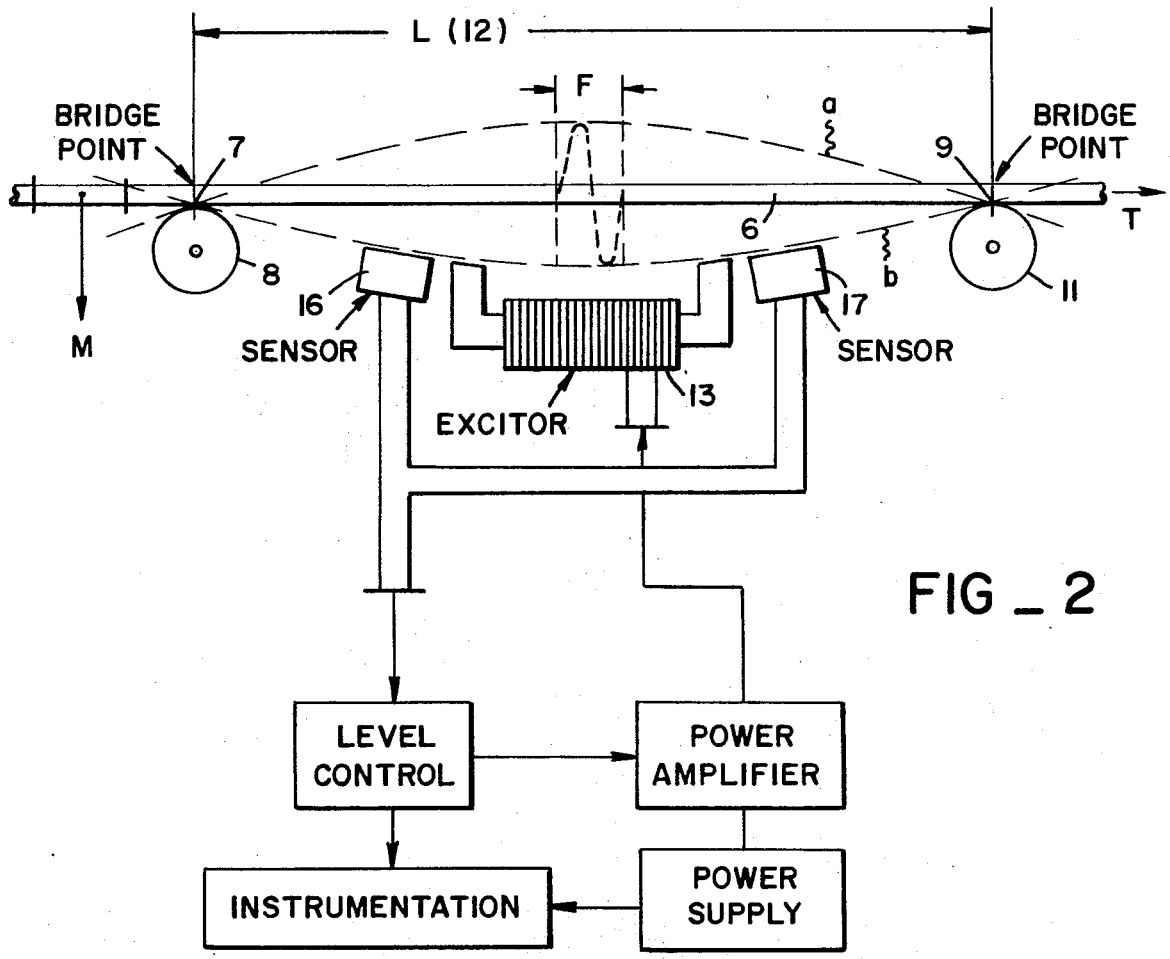
FIG_2

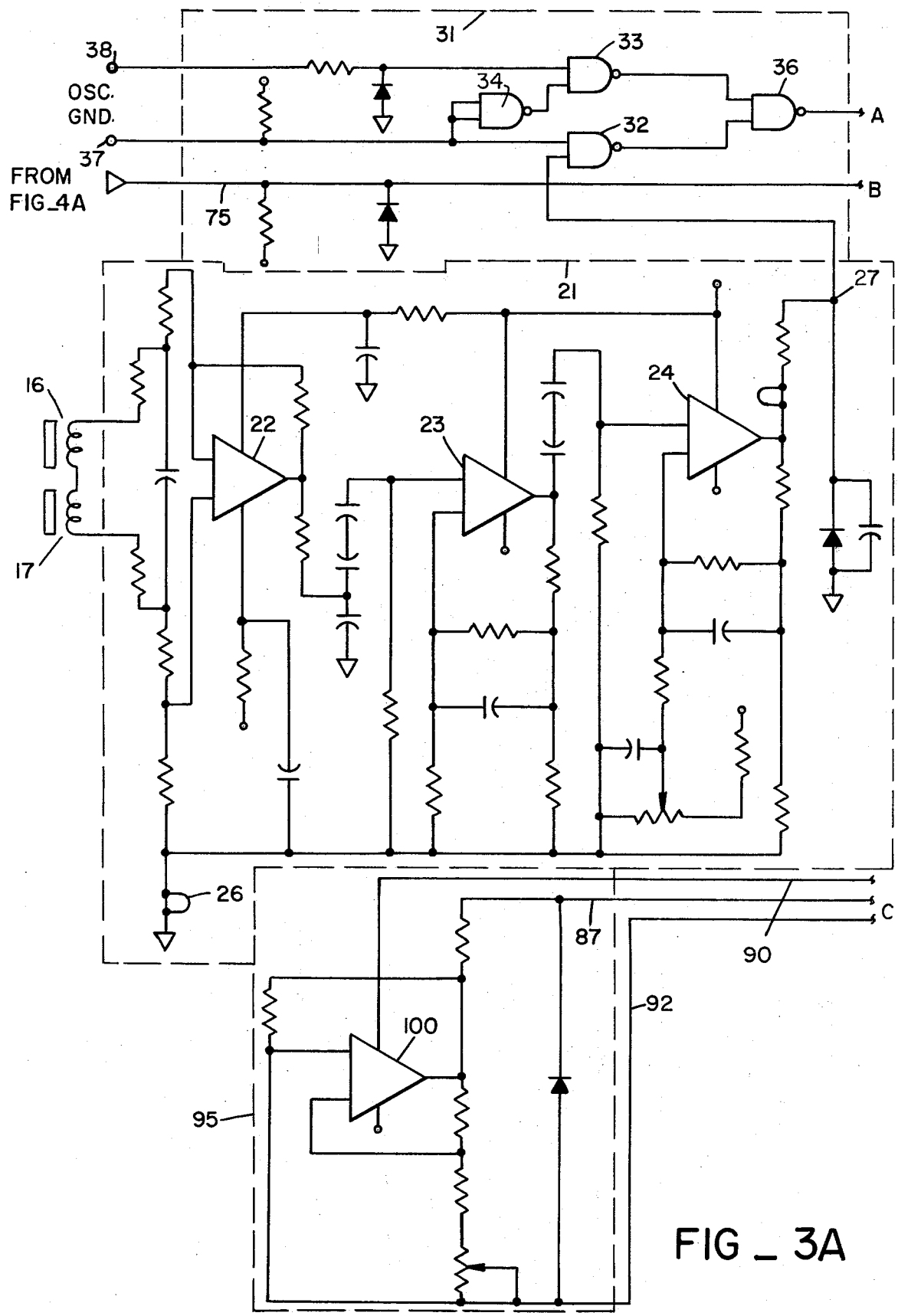
FIG_3A

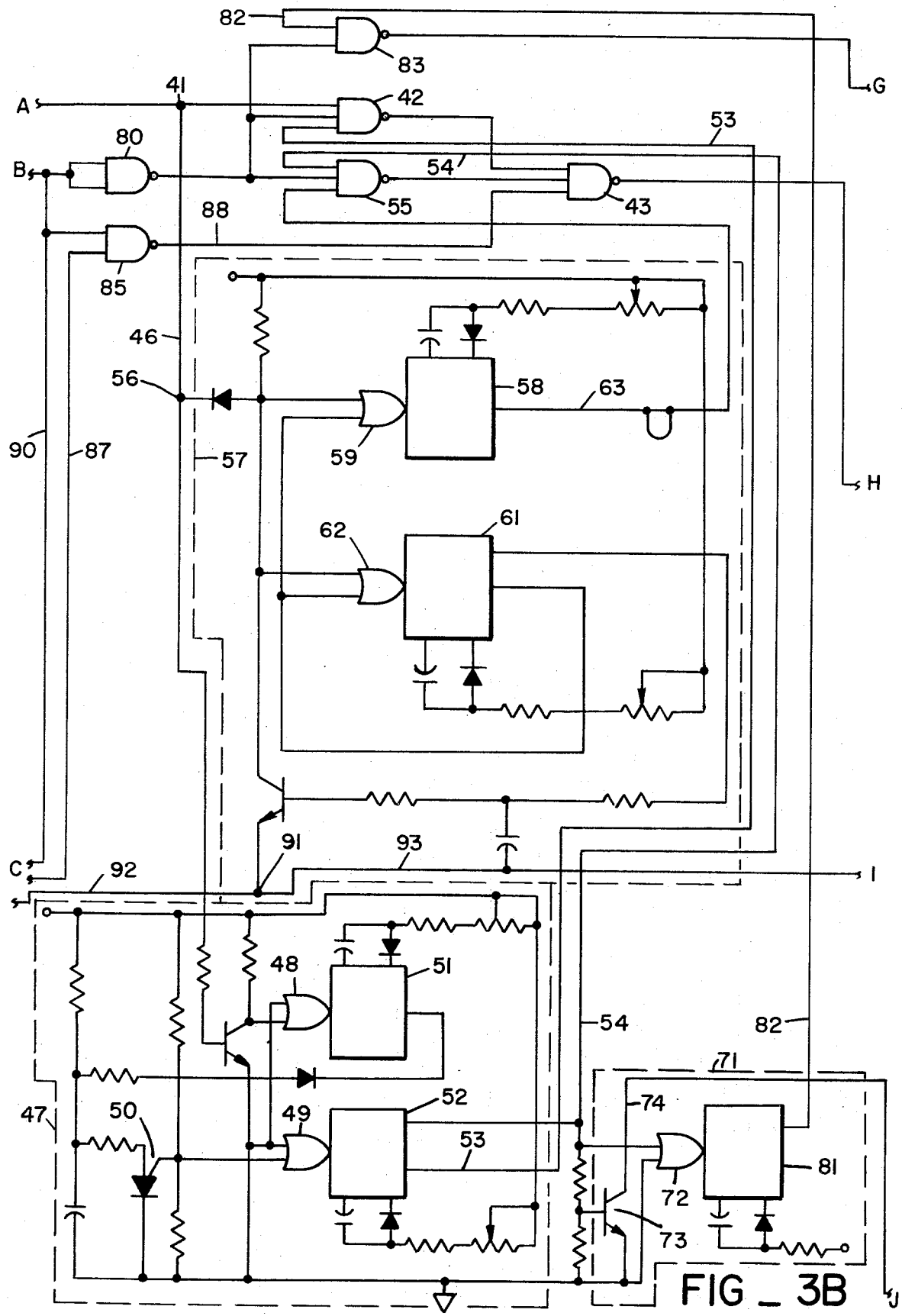
FIG_3B

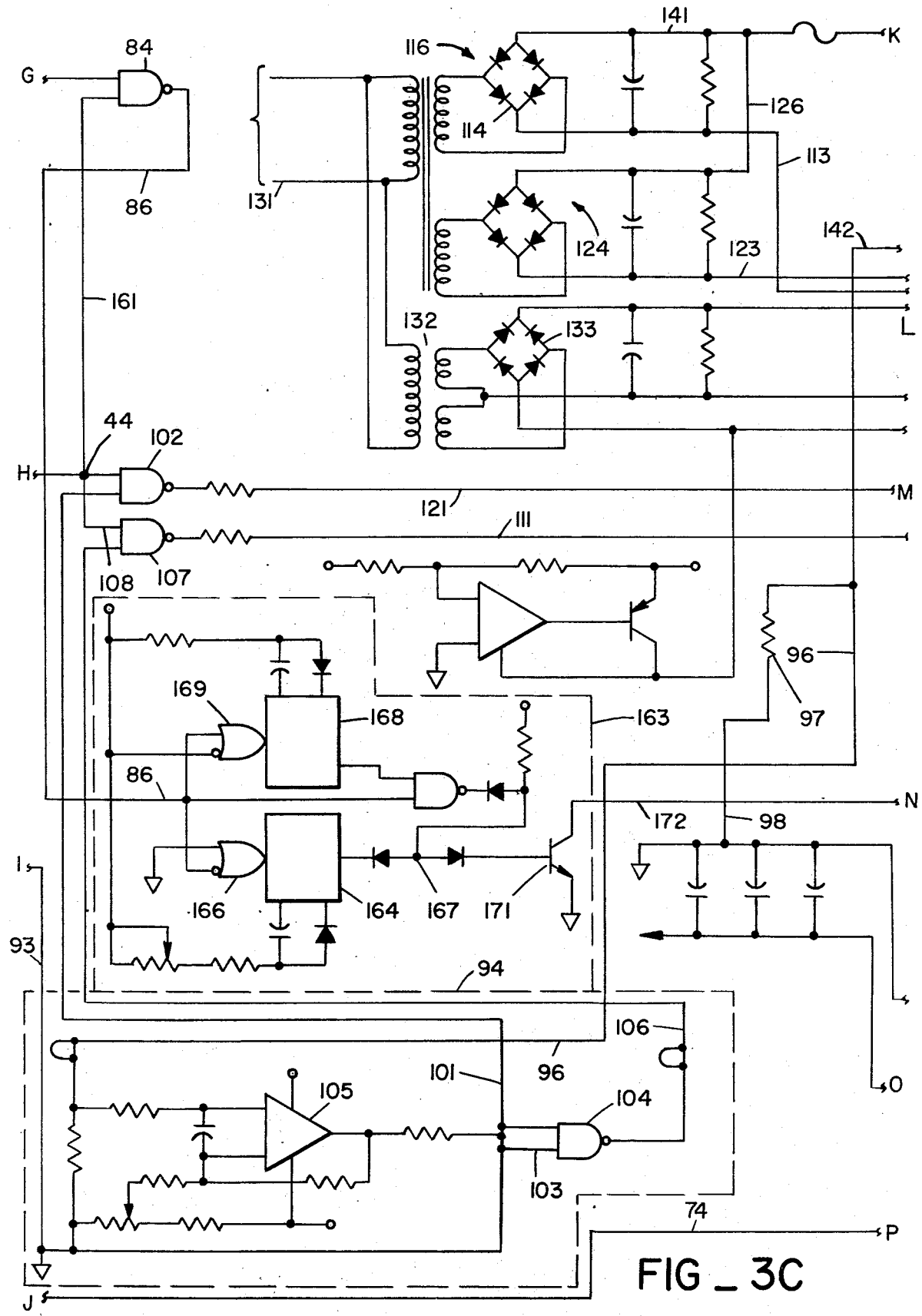
FIG_3C

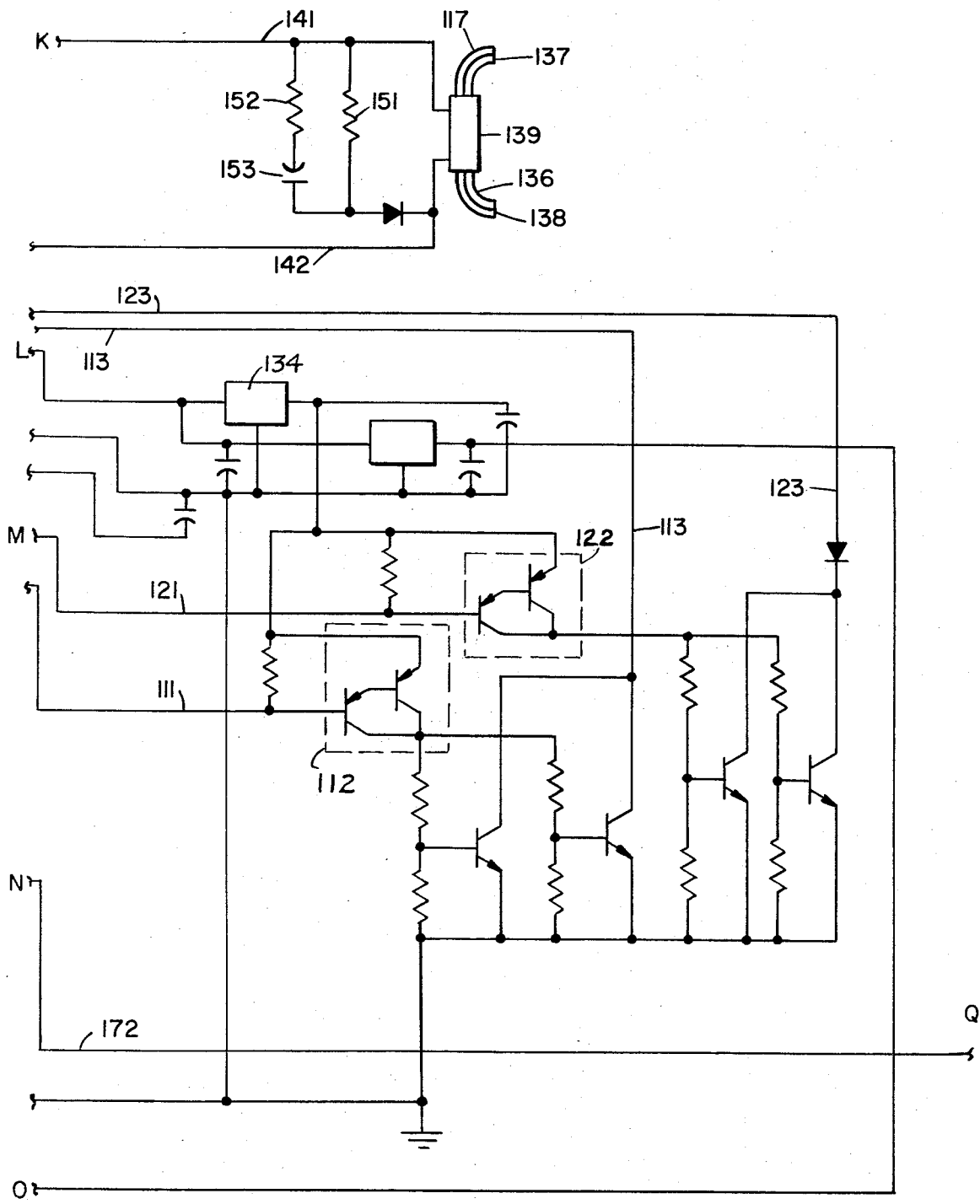
FIG _ 3D

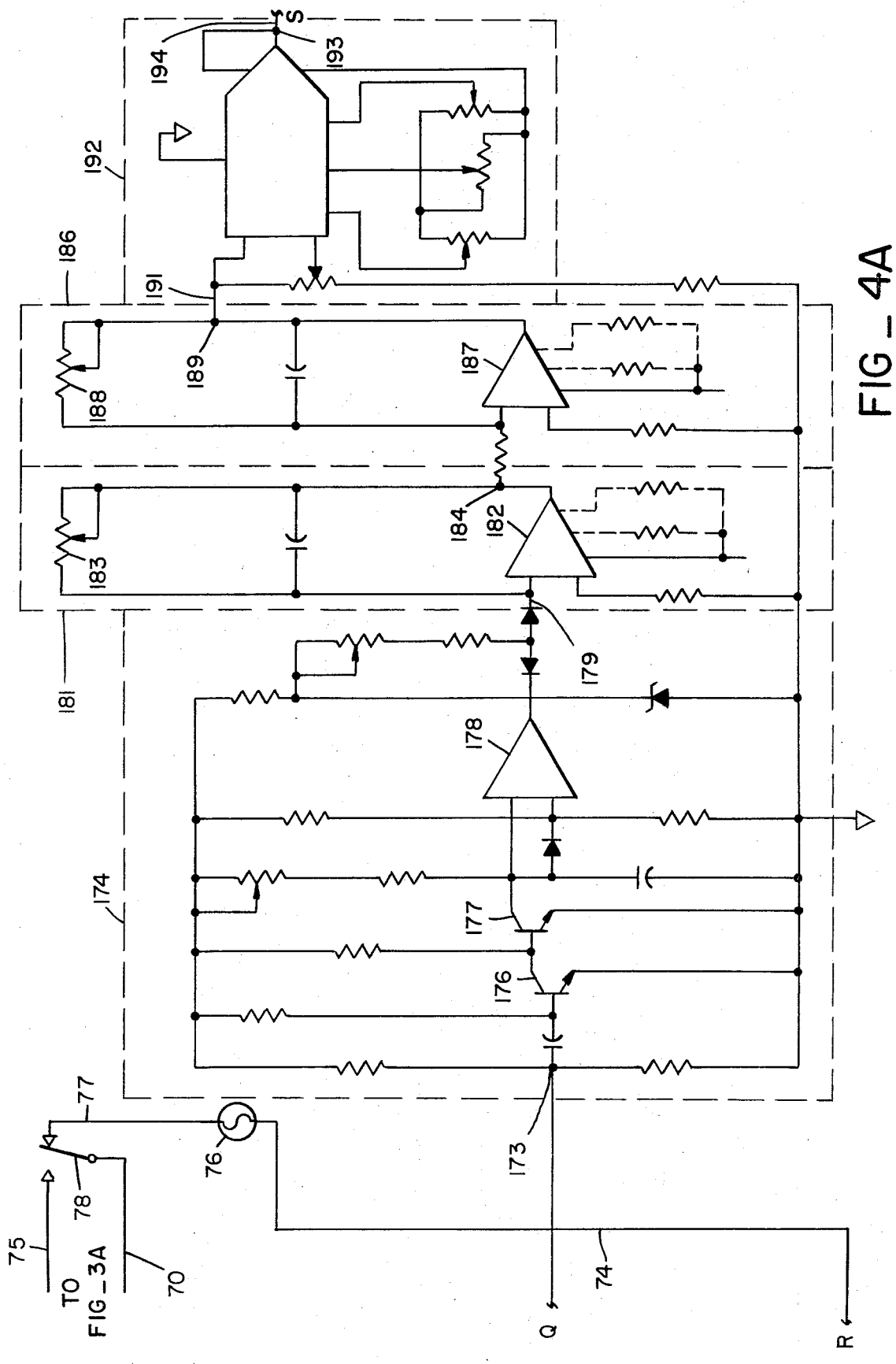
FIG_4A

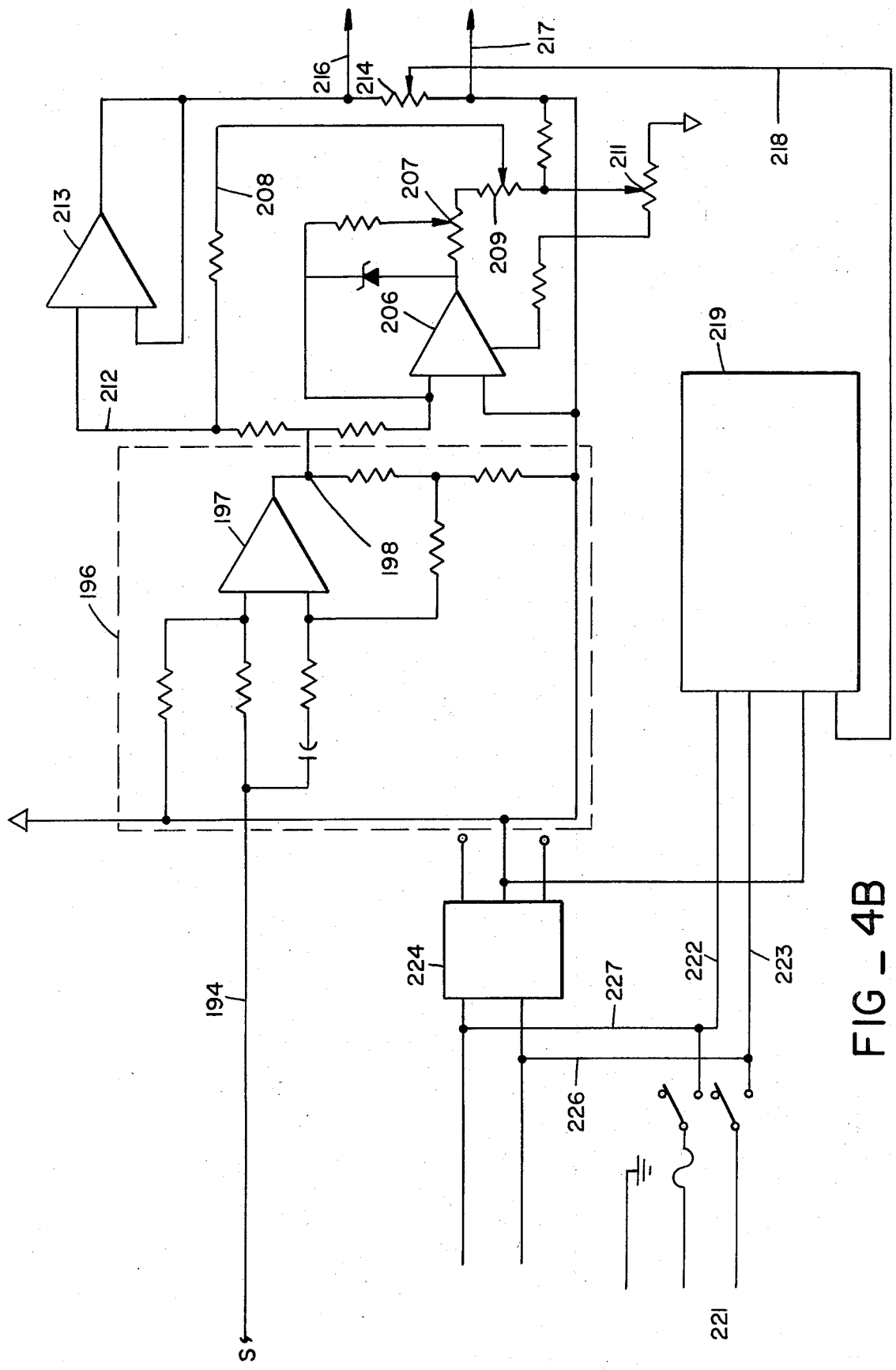
FIG_4B

CONTINUOUS CABLE TENSION MONITOR

In many environments, particularly in connection with construction and drilling activity, especially undersea drilling activity, it is important to know and maintain the tension in a cable or in each of a number of individual cables. Reference to cables herein is to a ferrous wire assembly, sometimes referred to as wire rope, as well as to a link strand in the form of a chain. Under many circumstances, such as great tension, both wire rope or cable and chain act similarly or even identically.

In order to determine from time to time or continuously the tension in a cable, it has heretofore been customary to insert into the cable system at some convenient point a device deformed by the cable tension for directly measuring the tension in the line. That is, the measuring device or indicating device is included in series in the cable line. This means that it is necessary to interrupt the cable in some fashion or to provide special machinery so that the tension can be so measured. The machinery must withstand the maximum expected tension and is apt to be inefficient and inaccurate. A continuous, fair reading under working conditions is difficult or impossible to obtain.

There has heretofore been an approach toward determining cable tension by exciting the cable to vibrate at its natural or fundamental frequency and to measure the frequency of vibration of the cable as an indication of its tension. See U.S. Pat. No. 3,540,271 issued Nov. 17, 1970. The frequency-tension relationship can be expressed in a relatively simple formula. Many mechanical and vibratory mechanisms heretofore known have been relatively bulky and have consumed a great deal of power. While some have had the merit of not requiring inclusion in the tension portion of a cable, nevertheless they have required a great deal of attendant and auxiliary equipment and have not always produced consistent, reliable, accurate results.

It is therefore an object of the present invention to provide a tension monitor which can be utilized in connection with a cable and without inclusion mechanically in the cable itself or in the cable rigging.

Another object of the invention is to provide a monitor effective to afford an accurate, reliable reading.

Another object of the invention is to provide a continuous tension monitor that is relatively small and compact and can easily be adapted for use adjacent a cable in sundry different environments.

An additional object of the invention is to provide a continuous tension monitor that utilizes relatively small amounts of readily available power and does not require special waste heat dissipation.

A further object of the invention is to provide a continuous tension monitor that can be used in the field with cables of varying diameters from relatively small; say, ½ inch diameter, up to considerably larger; say, four inches or more in diameter.

A further object of the invention is to provide a continuous monitor that will afford an accurate reading from an appropriate meter without the necessity of computation or calculation by the user.

A still further object of the invention is to provide a continuous tension monitor that can be manufactured, sold and maintained for a reasonable price.

An additional object of the invention is in general to provide an advanced, improved tension monitor.

A further object of the invention is to provide a tension monitor that can be used with wire rope and link chain.

Other objects, together with the foregoing, are attained in the embodiment of the invention described in the accompanying description and illustrated in the accompanying drawings, in which:

FIG. 1 is a diagram illustrating the external appearance and a usual installation or environment of a continuous tension monitor pursuant to the invention;

FIG. 2 is an illustrative diagram showing a typical environment and block arrangement of the present monitor;

FIGS. 3A, 3B, 3C and 3D when placed in succession with FIG. 3A to the left and FIG. 3D to the right show in diagrammatic form circuit connections and units for the excitor-sensor portion of the monitor; and FIGS. 4A and 4B when turned to the side and placed with FIG. 4B to the right show in diagrammatic form circuit connections and units for the instrumentation portion of the monitor.

As indicated, the monitor pursuant to the invention measures and displays the tension in a cable continuously. It also compensates for the stiffness in wire rope and related effects in chain. It is utilized in cables ranging from relatively small to relatively large sizes and in connection with similar variations in size in chains or link members, as well.

In a diagrammatically illustrated (FIG. 2), typical installation utilized as an explanatory version of the device, a cable 6 such as a wire rope or a chain or a comparable flexible device under tension is employed. In the customary installation, the cable is installed in contact with a first bridge point 7. This may be the point of cable contact with a pulley or sheave 8 over which the cable is trained. A second bridge point 9 is established by a pulley 11 or comparable guide. The cable has a free span 12 between the bridge points 7 and 9. It is important to know accurately the distance between such bridge points and this is indicated by the dimension L in FIG. 2.

It has been established that the tension in this or any comparable cable is represented by the expression:

$$T = 4ML^2F^2 - K$$

in which $T$ is tension in the cable measured parallel to its length or axial extent; $M$ is the mass of the cable per unit length, for example, the weight of the cable in pounds per linear foot divided by the force of gravity; $L$ is the length between bridge points, the points 7 and 9 in FIG. 2; $F$ is the natural, base or fundamental frequency of the cable when subject to the tension $T$ and $K$ is an artificial constant or known value derived experimentally or by approximations for correcting the formula for the particular kind or type of cable or chain in question. $K$ is largely controlled by cable stiffness and cable end conditions.

In the foregoing expression it is desired to find the tension T. The mass of the cable M is known or is easily determined. The length L is likewise known or easily measured from established points. The natural frequency of the particular cable under the tension T is measured by the present device. The constant K is an empirically derived value in pounds subtracted from the result attained by substituting the known and measured values in the stated formula.

In the present device, there is no mechanical connection with the cable but by means of an electromagnetic driver 13 between the bridge points 7 and 9 the cable is set into transverse oscillations or vibrations. The driver 13 or excitor is supplied with electricity, preferably in timed relationship with the swings of the cable. By means of the resulting magnetic field, the driver exerts transverse or lateral forces on the cable. The cable is thus excited, driven or "played" and responds at a characteristic frequency under the imposed tension. The driver pulls the cable toward the driver during the time the cable moves toward the driver and, after the cable has been fully set in motion, imparts only the energy necessary to overcome damping losses in the cable. In a typical case this is about 50 watts. The extremes of cable travel are represented by lines $a$ and $b$ in FIG. 2.

The excitation is preferably with sufficient force to establish a reasonable amplitude of vibration and if such excitation is carried out at a relatively low frequency then the rope vibrates primarily at its fundamental or natural frequency and without any substantial harmonics which can be disregarded since they are relatively small. As an example, it is pointed out that with a cable of 1 ½ inches in diameter, if the bridge length is about 40 feet and if the frequency of excitation is about 10 cycles per second, then the primary vibrational mode of the cable is at a natural or fundamental frequency. While the length and diameter ratio is not critical, it is usually preferred to keep the bridge length approximately equal to 120 diameters of the rope.

The oscillating frequency of the cable is detected or picked up by sensing means responsive to perturbations in the ambient magnetic field due to cable motion. The sensing means include coils 16 and 17, later described, affording a correspondingly varying electrical output that is manipulated appropriately, as indicated by the boxes in FIG. 2, and ultimately affords a display representative of instantaneous cable tension.

The stationary sensor coils have induced in them a voltage proportional to the rate of change of motion of the cable relative to the coils. When measured this voltage change appears as a sine wave having the same frequency as the cable oscillation. The amplitude of the sine wave is proportional to the time rate of change of cable motion, or velocity. When the cable approaches the sensors the cable alters the magnetic field surrounding the sensors and induces a voltage across the sensor terminals. When the cable stops, there is no field change and the induced voltage across the sensor becomes zero. Return motion of the cable similarly produces a voltage but of the opposite sign. The induced voltages are proportional to velocity rather than position and are ninety degrees out of phase with cable position.

If then the cable is excited at its natural or fundamental frequency, which is dependent upon the tension, then it is necessary to measure the frequency and express such measurement in tension terms.

The sensors 16 and 17 may be considered as a single element, but are preferably comprised in practice of a pair of individual coils wrapped around permanent magnetic cores and very carefully encapsulated or secured thereto. The coils are subject to magnetic fields, but have no or substantially no motion relative to the permanent magnet cores. This means that the coils accurately reflect only variations in the magnetic field surrounding them. The coils 16 and 17 are physically located close to the driver 13 and close to the cable 6 between the bridge points 7 and 9 in a zone wherein the transverse oscillation of the cable occurs relatively close to the coils but without mechanical contact or interference. The coils are arranged in such a way that perturbations in the surrounding magnetic field, not due to the motion of the cable, affect the coils substantially equally and oppositely. These extraneous perturbations are thereby canceled and leave only the response to the field change due to cable motion as signals within the series connected coils of the sensors 16 and 17.

Since it is desired that any induced electrical voltage across the coils of the sensors 16 and 17 be converted to a relatively accurate square wave, the output of the coils is fed into an amplifier represented by a block 21 (FIG. 3A). The amplifier is inclusive of a first stage 22 having an amplification factor or gain of approximately 100 feeding into a second amplifier stage 23 with a further gain of 100 and finally into a third stage 24 which has a further gain of 100. The total amplification of the incoming signal is represented by $10^6$.

Although illustrated in considerable detail in FIG. 3A, the three stage amplifier 21 is of relatively standard construction and hence is not described in detail herein. The symbols utilized are those customarily employed. The amplifier, as does some of the rest of the circuitry illustrated, includes at various points loops 26 utilized only for testing. They do not affect the operation of the mechanism.

The amplifier 21 provides an output at a point 27 which is substantially the initial signal heightened and clipped to afford virtually a square wave, the repetition rate or frequency of which is the same as the frequency of vibration of the cable.

There is provided a switching circuit represented by a block 31 through which the square wave signal from the output 27 of the amplifier 21 is passed. This switching circuit is primarily included for use in manufacturing the device or in subsequent rebuilding or servicing of the device. It need not always be included. Within the block 31 there is a gate 32 in parallel with a gate 33, the two gates being bridged by a third gate 34 and being connected to an output gate 36.

Connected to the gates 32 and 34 is a connector 37, which, for test, can be grounded while connected to the gate 32 is a terminal 38 to which a standard frequency oscillator can be attached. When the terminal 37 is grounded, a signal from the point 27 is prevented from getting through the gate 32 and the gate 36. For test purposes, when the frequency oscillator is connected to the point 38 then the gate 33 is open and passes the oscillator signal through the gates 33 and 36. Thus, the signal from the amplifier 21 can be compared with a standard frequency oscillation for adjustment or test purposes. The amplifier signal, when the switching block 31 is not used, travels from the gate 36 to a junction point 41 where it is divided. One portion goes through a gate 42 and a gate 43, later to be described, and arrives at a control point 44.

Another portion of the signal goes from the junction 41 through a conductor 46 into a frequency block 47 for checking the incoming signal frequency. It often happens that the incoming signal is not pure but carries with it a great deal of noise or "hash" and this is particularly true when the unit is first being started in operation. Also, there is almost inevitably some outside mechanical vibration impressed upon the system and showing up in the signal at the junction point 41. The range of natural frequencies of the cable being checked is pretty well known in advance and the spurious frequencies are usually well out of such range and are in considerably higher frequency ranges. It is helpful to distinguish between the wanted range and the unwanted ranges.

For this reason, it is provided in the frequency block 47 that the signal in the conductor 46 is presented to a transistor connected to gates 48 and 49. The first of the gates controls a retriggerable or one-shot multi-vibrator 51 functioning at predetermined intervals (or at a set frequency). The other gate 49 is effective upon a multi-vibrator 52. The multi-vibrator 51 is triggered for short intervals by incoming high frequency. If such frequency is in but a single short burst, the output of the multi-vibrator 51 is short but if the incoming bursts are frequent, the multi-vibrator affords a virtually continuous output. This output affects a pulsing mechanism 50 and affects the gate 49 for the multi-vibrator 52. If the incoming frequency is acceptably low the multi-vibrator 52 affords one output in conductors 53 and 54, whereas if the incoming frequency is within an unwanted, spurious, high range, the output in the conductors 53 and 54 is reversed. Thus a signal in conductor 53 blocks the gate 42 so the path to the control point 44 is unavailable. A signal in the conductor 54 conditions a gate 55. Thus, the incoming signal, if noisy, is not transmitted to point 44 but is sampled repeatedly and is advanced in the circuitry when its noise frequencies are within a reasonable range.

There is another, parallel path for an incoming signal from the junction 41 and present in the conductor 46. At a junction 56 a connection is made to a control block 57. This has the function of conditioning the incoming signal when its frequency is excessive or out of normal range to bring it near the range of natural cable frequency. The block 57 is inclusive of a pulse generator 58 for generating a pulse of fixed width controlled by a gate 59 receiving the incoming signal and also responsive to a signal of at least twice the width from a pulse controlled by a generator 61 effective to control a gate 62 as well as the gate 59. The effect of this mechanism is for the fixed width pulse generator 58 to condition the incoming signal from the point 41 to pulses of fixed width while the generator 61 ensures a time or space between pulses from the generator 58 at least as great in width as the pulse. There is thus an appropriate on-time and an equally appropriate offtime to condition the incoming signal to an appropriate shape and frequency. The conditioned pulses are conducted through a lead 63 to the gate 55 and in turn through the gate 43 so that a corrected or conditioned incoming signal is passed to the control point 44. When there is no such conditioned signal, the gate 55 is closed.

If signals having a great deal of excessive noise are received and passed to an indicator, they would afford a pulse reading subject to error. For that reason it is arranged that extremely noisy signals are prevented from getting to the indicator. When a signal from the multi-vibrator 52 in the panel 47 is transmitted to the gate 55 and opens it so that the gate 43 is blocked and prevents transmission of that signal to the control point 44, a portion of that signal is diverted from the conductor 54 into a block 71. Therein the signal affects a gate 72 and also controls a transistor 73. The transistor output is carried through a conductor 74 and energizes a light 76 constituting an alarm and joined through a conductor 77 and a manual switch 78 to a five volt current source. Thus, an improper signal affords an alarm to warn the user not to rely upon any indicator showing.

At the same time the gate 72 is effective to release a signal from a generator 81 to travel through a conductor 82 to gates 83 and 84 and effective through a conductor 86, as will hereinafter appear, to stop signal delivery to the indicator device. Thus, when there is an improper signal, an alarm is given and also the indicator is cut off, thus making doubly certain that the mechanism is not relied upon for a tension indication.

If the system is to be started under quiet circumstances an artificial oscillator source must sometimes be utilized. Mechanical vibration in the cable being measured usually affords oscillations to start the system to function but under some circumstances such outside excitation is not available or under test circumstances under very quiet conditions a manual start may be necessary. Thus, when the switch 78 is shifted from the position as shown in the figure to its opposite position, it then supplies power from a 5 volt source available in a conductor 70 to flow into a conductor 75 to open a gate 80 which blocks gates 42, 55 and 83 and opens a gate 85 providing a new path for transmission of a signal to the control point 44 and also to energize an extension 90 going to a block 95.

Within the block 95 is a fixed frequency oscillator 100 which when energized affords an output of fixed frequency through a conductor 87 which extends to the gate 85 so as to transmit the fixed frequency through a conductor 88 and through the gate 43 to the point 44.

In this way an initial or starting signal of known or fixed frequency is manually supplied to the control point 44 and is utilized in place of a naturally occurring signal derived from the sensors 16 and 17. When there is no longer need for the artificial, fixed frequency input signal, the switch 78 is restored to its former position and serves to reconnect the alarm circuitry for further use if needed. The standard frequency from the control point 44, as will later be explained, is sufficient to drive the cable to respond at its natural frequency so that the pick ups or sensors 16 and 17 are effective thereafter to operate the device.

It is deemed important initially to use a large voltage to energize the cable driver when the vibration begins and to reset this voltage to a relatively reduced value to maintain the later driving energy at a predetermined level. In this way, the maintainance power in a typical case may average only 25 watts.

For that reason a signal through a gate 107 for high voltage control is carried by a conductor 111 into a signal amplifier 112 the output of which is effective through a conductor 113 to actuate a control element 114 of a high voltage power supply 116 to afford power to the excitor or driver 117, later to be described. Similarly, when the gate 107 is closed and a gate 102 is open, a conductor 121 leads to a signal amplifier 122 the output of which is effective through a conductor 123 to activate the control portion of a low voltage supply 124 affording output through a conductor 126 to the driver 117. The signal amplifiers are appropriately fed from a power source 131 through a transformer 132 and rectifying units 133 feeding an appropriate low voltage power supply 134. The average driver wattage is thus quite low.

The block 57 affords an output signal at a junction 91. Also, a signal derived from a block 95 is carried by a conductor 92 joined to the junction 91. From the point 91 a signal goes through a conductor 93 to a block 94 including a current sensing circuit. A plus five volt lead 96 extends from the driver or excitor in parallel with a sensing resistor 97, the circuit being completed by a conductor 98 to ground. A voltage comparator 105 is in the block 94. The output from the comparator 105 appears in a conductor 101 leading to a gate 102 connected to the control point 44. The gate 102 passes a low voltage control from the comparator through a conductor 121. The output of the comparator is also found in a conductor 103 operating through an inverter 104. The output of the inverter is carried by a lead 106 to the parallel gate 107 having a lead 108 going to the control point 44. The gate 107 when open activates a high voltage control in a conductor 111 to get current into the coil 139 rapidly. Thus the resistor 97 and the comparator 105 regulate the voltage supplying the coil 139 for rapid current build-up and low maintainance.

The effect of the interconnections to the block 94 is that the voltage across the sensing resistor 97 is made effective through the conductors 101 or 106 to control the gates 102 and 107. When the detected voltage is relatively low, meaning that the current through the coil is low the gate 107 is open and affords a relatively high voltage to raise the current level. When the current reaches a predetermined level a relatively low voltage maintains it. The block 94 inhibits the gate 107 and enables the gate 102 alternately so that a relatively high and low voltage program is effective to build up and then sustain the magnet current used to vibrate the cable.

The excitor or driver 117 particularly includes an appropriate magnetic core 136 conveniently of U shape having pole pieces 137 and 138 with their terminals substantially in the same plane and located quite close to but out of mechanical contact range of the vibrating cable 6. Wrapped around the magnetic core 136 is a coil 139 connected by a conductor 141 to the high voltage source 116 and to the low voltage source 124 through the conductor 126. The coil 139 is also joined by a conductor 142 to the conductor 96 and to the conductor 98 through the resistor 97.

Shunting the terminals of the coil 139 are parallel resistors 151 and 152, the latter of which is connected through a capacitor 153, so that when the coil 139 is de-energized the peak values are rounded off.

Since the driver 117 is initially started from a zero current condition with a high voltage and then the current is continued with a low voltage, means are provided for making sure than when the switch is made between high voltage drive and low voltage drive, the duration of each drive continues uninterruptedly for at least a fixed short term. The reason for this is to eliminate the effect of extraneous "noise" or vibrations which might be impressed on the system due to mechanical disturbances from outside the system.

A signal at the control point 44 is effective through a conductor 161 on the gate 84 producing an output through the conductor 86 leading to a signal hold block 163. This block includes a timing one-shot multi-vibrator 164 controlled by a gate 166 and effective to afford an output to a junction point 167 and also includes a timing one-shot multi-vibrator 168 controlled by a gate 169. The one-shot vibrators 164 and 168 are each effective when initially energized to maintain the received signal for a predetermined length of time at its previous value. One multi-vibrator receives and provides a relatively low value signal whereas the other multi-vibrator receives and provides a relatively high value signal. Both multi-vibrators thus prevent a transistor 171 from switching on spurious noise and producing an erroneous square wave through conductor 172 and a point 173 to an output indicator.

The signal in the conductor 173 is received in a block 174 including transistors 176 and 177 feeding into an amplifier 178. Together with the associated circuitry these provide in a conductor 179 a generated pulse of constant amplitude and of constant width for each cycle of the input frequency signal. Thus, with reference to the original formula, a clean signal representative of the value F is available in the conductor 179. It remains to utilize that representative signal in connection with the other factors in the formula. For that reason, there is provided an amplifier block 181 including an amplifier 182 receiving the signal from the conductor 179 and effective to multiply therewith a set value represented by the chosen position of the variable resistor 183 for this use and equivalent to the bridge length L of the particular installation in which the mechanism is momentarily utilized. There is thus available at a junction 184 a value equivalent to the vibratory frequency times the bridge length.

This signal is then conducted from the function 184 into a weight block 186 containing a similar amplifier 187 and a comparable variable resistor 188 set in this instance to represent the square root of the weight per unit length of the particular cable being vibrated. There is thus a multiplication in the weight block 186 by a factor equivalent to the square root of the cable mass M. The signal or equation at the point 189 then involves the factors F times the factor L times the square root of the factor M.

From the function point 189 of the block 186 there is a conductor 191 leading to a block 192 which is a virtually standard squaring circuit. This affords as an output at a junction 193 a direct current voltage representative of the factors $F^2L^2M$. The direct current voltage, however, is not necessarily pure but may readily have some alternating current ripples in it. These are sufficiently small so that if the indicator is an analog meter the ripples are inconsequential and are ironed out or averaged in the meter. However, it is often desired to utilize the signal at the point 193 in a digital meter. Any included ripples are excessive for this type of display.

Consequently, the output from the junction 193 is carried by a conductor 194 into a block 196 which in turn includes an amplifier 197 effective to subtract the ripple or the alternating current component of the signal and affords a smooth and appropriate direct current signal at a junction point 198.

Now the signal at the terminal 198 is a proper representation of the cable tension except for the subtraction of the factor K and except for some possible adjustment in the event chain rather than wire rope is being measured.

It has been indicated that a device of this sort can be utilized on link chain as well as in connection with continuous cable. It is usually found, however, that a chain acts somewhat differently under vibration than does a cable in that when the tension in the chain is relatively low there may be some individual movement between the chain links. This varies somewhat with tension and so affords a different relationship between tension and frequency of vibration than would be expected. When the tension in the chain increases sufficiently, however, there is substantially no movement between adjacent links and the chain acts just as wire rope does. Stated differently, while a wire rope has generally a straight line relationship when tension is plotted against the vibrational frequency squared, a chain may have a curve which when similarly plotted has a knee or bend between two straight portions but of different slope. The steeper slope is nearer the origin and a relatively flatter slope continues past the knee. Thus, in dealing with chains it is often not adequate to subtract a constant or linear value K for all values of tension but it is necessary to subtract special, non-linear values of K.

The signal from the terminal 198 is divided and part goes to an amplifier 206 having a non-linear characteristic adjustable by a variable resistor 207 to afford a compensating "knee" curve to correct for the fact that chain is being measured. For wire rope, the knee compensation can be omitted. Another part of the signal from the terminal 198 travels through a subtraction conductor 208 connected to circuit common through a variable resistor 209 and particularly through a variable resistor 211 so that the proper K value for the cable being measured is subtracted. The thus compensated (if necessary) and properly valued K factor having been subtracted, the remaining signal travels in a conductor 212 to a display amplifier 213 and then to a variable resistor 214 settable to change the scaling of the display meter. If desired, the conductor 212 signal is taken off on opposite sides of the resistor 214 and is carried by conductors 216 and 217 to a recording device, (not shown).

The display signal travels in a conductor 218 to a display device such as a digital voltmeter 219. This meter is supplied with power from a source 221 through conductors 222 and 223. An auxiliary power supply 224 for the units 174, 181, 192, 196 and 206 as well as 213 is fed through conductors 226 and 227 from the source 221.

With the described vibrational cable monitor it is possible in nearly any environment and without any mechanical connection to the cable and with the use of only modest power to afford an accurate, highly corrected, virtually noise free signal directly readable in figures denoting tension in the cable and to do so continuously. A single instrument can be used with a range of cables of varying sizes and can be interchangeably used with wire rope or chain. The cable is simply vibrated at its natural frequency with only small power and extraneous frequencies are rejected. The means for sensing the cable vibration is not adversely affected by the adjacent driver or excitor or by stray field perturbations. Random noise signals are conditioned to seek the natural frequency of the cable. A generally improved device has been presented.

What is claimed is:

1. A cable tension monitor comprising an electromagnet having a pole adapted to be disposed adjacent a cable and having a magnet coil, a first electrical circuit including said magnet coil, means for periodically energizing said first circuit to establish a magnetic field adjacent said cable, a pair of pick-up devices disposed in said field spaced from opposite ends of said pole and effective to furnish repeated signals in accordance with perturbations in said field, an indicating device, means including a second electrical circuit and responsive to said repeated signals from said pick-up devices for controlling the frequency of energizing said first circuit, and means in said second electrical circuit for actuating said indicating device.

2. A device as in claim 1 including means in said second circuit for limiting said frequency to a frequency approximately the same as the natural frequency of said cable under tension.

3. A device as in claim 1 in which said means for energizing said first circuit employs an initially relatively high voltage to induce current in said magnet coil and a subsequent relatively low voltage to maintain said current in said magnet coil.

4. A device as in claim 1 in which said pick-up devices of said pair are connected in series.

5. A device as in claim 4 in which said pick-up devices include coils disposed on opposite ends of and adjacent to said electromagnet.

6. A device as in claim 1 in which said electromagnet has a C-shaped pole piece with the ends thereof terminating in substantially co-planar surfaces parallel to said cable, with the portion of said pole piece between said ends also parallel to said cable and with said magnet coil disposed on said portion between said ends with the axis of said coil substantially parallel with the axis of said cable.

7. A device as in claim 1 including manually controlled means in said first electrical circuit for introducing oscillations therein.

8. A device as in claim 1 including means for interrupting said means for actuating said indicating device.

9. A device as in claim 1 in which said actuating mass includes means for subtracting from said second electrical circuit a predetermined amount of energy corresponding to a factor correcting for cable stiffness.

10. A device as in claim 9 in which said predetermined amount is variable.

11. A device as in claim 1 including means in said second electrical circuit for conditioning random noise signals received by said pick-up devices into signals having substantially the natural frequency of said cable under tension.

* * * * *